United States Patent [19]

Eguchi et al.

[11] Patent Number: 4,697,900
[45] Date of Patent: Oct. 6, 1987

[54] DISPLAY DEVICE FOR A CAMERA

[75] Inventors: Masaharu Eguchi, Tokyo; Masayoshi Kiuchi, Kanagawa, both of Japan

[73] Assignee: Canon Kabushiki Kaisha, Tokyo, Japan

[21] Appl. No.: 888,268

[22] Filed: Jul. 18, 1986

Related U.S. Application Data

[63] Continuation of Ser. No. 668,742, Nov. 6, 1984, abandoned.

[30] Foreign Application Priority Data

Nov. 9, 1983 [JP] Japan ................................ 58-210631

[51] Int. Cl.$^4$ ............................................. G03B 1/00
[52] U.S. Cl. .................................................... 354/215
[58] Field of Search ............... 354/214, 215, 217, 218, 354/173.1, 173.11, 289.1, 289.11; 352/170, 171, 172

[56] References Cited

U.S. PATENT DOCUMENTS

| | | | |
|---|---|---|---|
| 3,335,695 | 8/1977 | Hayashi | 352/172 X |
| 4,279,481 | 7/1981 | Ishibashi et al. | 352/171 |
| 4,432,628 | 2/1984 | Sakurada et al. | 354/217 X |
| 4,477,163 | 10/1984 | Matsumoto et al. | 354/217 X |

FOREIGN PATENT DOCUMENTS

| | | | |
|---|---|---|---|
| 36845 | 3/1980 | Japan | 354/217 |
| 87138 | 7/1980 | Japan | 354/217 |
| 89742 | 6/1982 | Japan | 354/173 |

*Primary Examiner*—W. B. Perkey
*Attorney, Agent, or Firm*—Toren, McGeady

[57] ABSTRACT

The disclosed display device has a number of display elements arranged in a row and successively driven so that a display film transport is presented as if the border of one film frame runs from one of two spools marks to the other in the same direction in which the film is actually being transported across the exposure gate. The display device also indicates whether or not a film cartridge is loaded in the camera.

11 Claims, 10 Drawing Figures

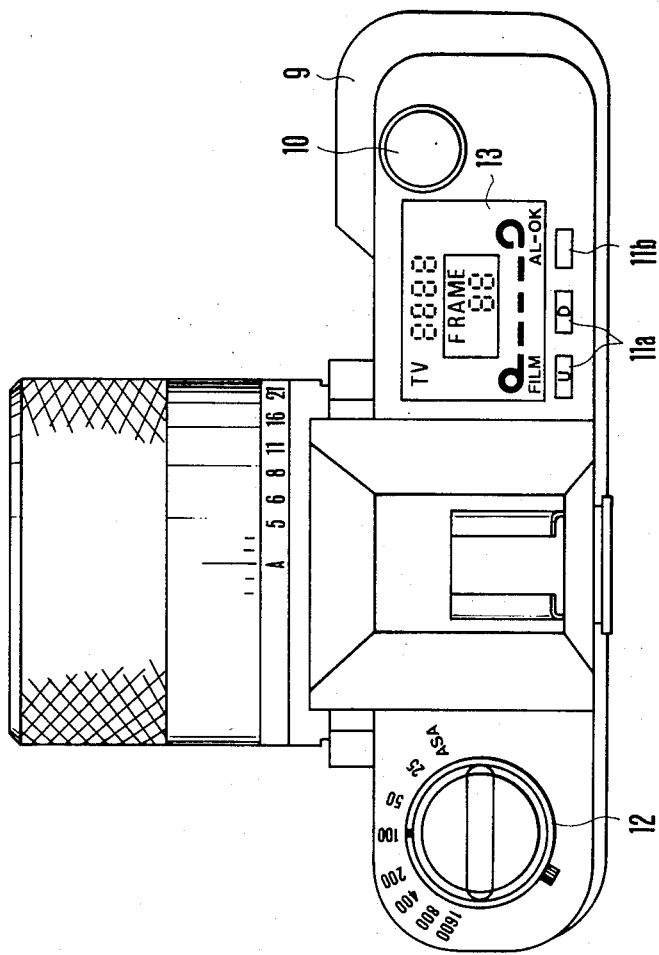

FIG.5
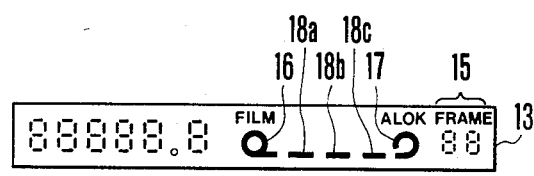
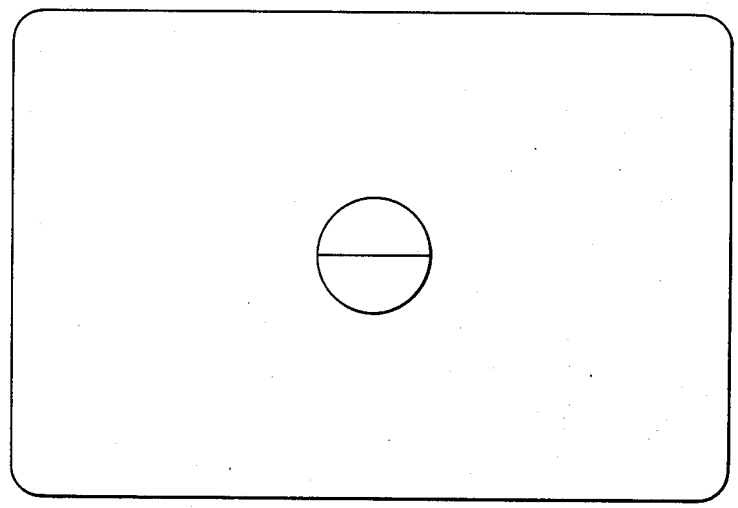

DISPLAY DEVICE FOR A CAMERA

This is a continuation of application Ser. No. 668,742, filed Nov. 6, 1984, now abandoned.

BACKGROUND OF THE INVENTION

1. Field of the Invention

This invention relates to a device for displaying whether a camera is loaded or unloaded with film as well as indicating when the film is being either advanced or rewound.

2. Description of the Prior Art

Many previous proposals have been made for preventing loaded film in a camera from being exposed as the back cover is unintentionally opened. For example, Japanese Utility Model Publication No. SHO 42-18571 discloses a method for displaying whether or not the camera is loaded with film by putting a colored warning plate into a window provided on the outer panel of the camera housing when the presence of film on the tape-up spool is detected. There also exists a warning method by which a display member is projected into the frame counter window. Another method works such that, the frame counter is rendered operative only when the film is loaded. In another foolproof method, the back cover of the camera is automatically locked after the film leader is wound off. In still another foolproof method, the winding operation is able to be performed only when the film is properly loaded.

Since any one of these known prior methods operates the display member through a mechanical intermediary element, the use of these methods leads to an increase in the number of parts and the production cost. Because little space is available within the camera, the display must be located as near as possible to the film or cartridge detector.

There have also been many previous proposals for displaying when film is being transported. For example, Japanese Laid-Open Utility Model Application No. SHO 53-36331 and Japanese Laid-Open Patent Application No. SHO 56-24234 disclose such systems. Since these systems are also mechanical, it is necessary to arranged such displays adjacent the detector.

It has been impossible to construct a common display indicating the presence or absence of the cartridge as well as whether or not film is being transported across the exposure gate. For this reason, in checking whether or not the camera is empty, or if the film is properly loaded and advanced for each frame, the photographer has to check each different display at a different place despite the fact that all of this information is film-related. These successive operations for assuring the state of the film at any given time have caused great annoyance to most photographers.

Since the loading and feeding are displayed in different forms, there has also been some confusion for beginners when the displays are read, regardless of the type of presentation of these displays.

SUMMARY OF THE INVENTION

An object of the present invention is to eliminate the above-described problems by unifying the display of the film being in a loaded or unloaded state, with the display of whether or not the film is in a state of being advanced or rewound, and by presenting the unified display in a form in which both states can be easily recognized.

Other objects of the present invention will become apparent from the following description of an embodiment thereof taken in conjunction with the drawings.

BRIEF DESCRIPTION OF THE DRAWINGS

FIG. 2 is a top view of the camera with the display device of the invention.

FIGS. 3(a) to 3(f) are plan views illustrating how the information on the display device of the invention changes as the film is loded and fed through.

FIG. 5 is a plan view illustrating where the filming display is positioned when the display device of the invention is made to present its display within the field of view of the finder.

DETAILED DESCRIPTION OF THE PREFERRED EMBODIMENT

Figure 1:
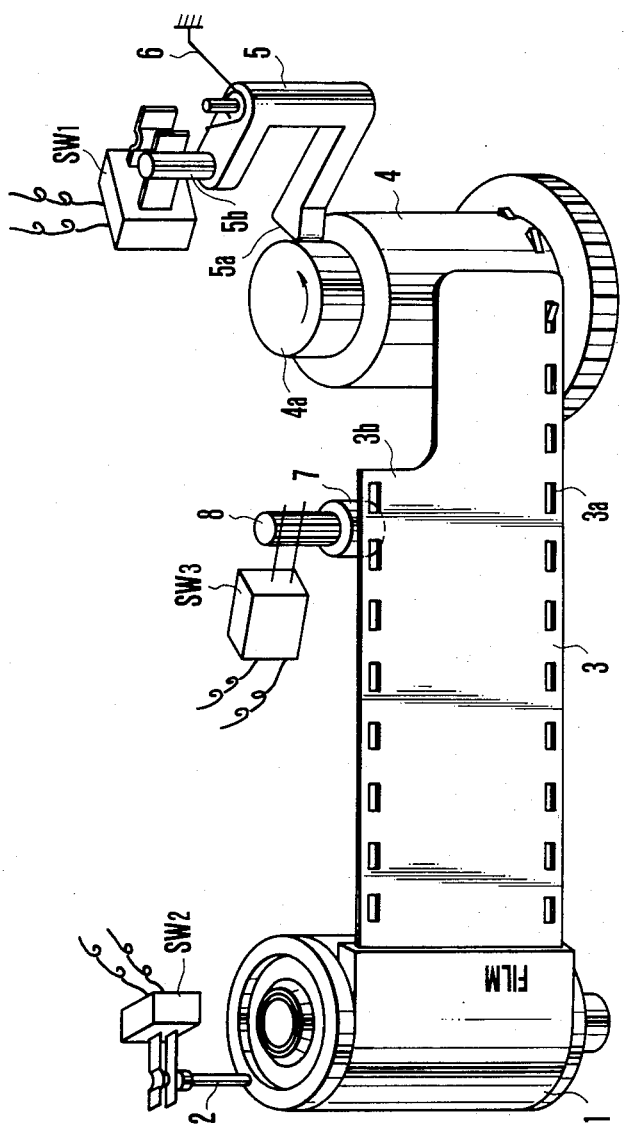
FIG. 1 is a perspective view of an arrangement of the film position detectors of an embodiment of the display device in the camera according to the present invention.

In FIG. 1, there is shown an embodiment of the display device according to the present invention. When a film cartridge 1 is inserted into and seated in a chamber within a camera housing, a normally open switch SW2 is closed by a detector pin 2 abutting on the casing of the cartridge 1. These parts constitute a mechanism for detecting the presence or absence of the cartridge 1 in the camera. Although in this instance the pin 2 is arranged to engage with the cartridge at the end surface thereof, it may also be arranged to engage with the cartridge at the side wall thereof.

A take-up spool 4 has a number of pawls in a circumferentially displaced relation to engage with the perforations 3a in the leader of the film 3. When the spool 4 turns in the direction as indicated by the arrow, the film 3 is wound onto the spool 4. This spool 4 has a large diameter portion for the film to be taken up thereon, and a small diameter portion 4a having a common axis with the large diameter portion.

A lever 5 is urged by a spring 6 toward the spool 4, so that its free end 5a always abuts the small diameter 4a. Mounted on this lever 5 is an actuator pin 5b for a normally open switch SW1. These parts constitute a mechanism for detecting when the film is properly loaded.

A roller 7 presses against the upper edge of the film 3, and rotates when the film 3 moves in either direction. A cylinder 8 coaxially bears on the roller 7, and has a number of pairs of electrically conductive and non-conductive areas, alternately arranged in the circumferential direction. Two contacts of a switch SW3, which turns on and off a number of times for every one revolution of the cylinder 8, pressed against cylinder 8. These parts constitute a mechanism for detecting when the film 3 is being transported. Instead of using the roller 7, it is also possible to use a sprocket engaging the perforations at the upper edge of the film 3. the cylinder 8 may be replaced by a cam, and the switch SW3 may be otherwise constructed to cooperate with the cam. Further, instead of a mechanical form for the detector, the photo-electric form, or the electrostatic capacity form may also be employed, as is well known in the art.

The outside of the camera, shown in FIG. 2, includes a plam grip 9, a release button 10, push buttons 11a labelled "U" and "D" which, when selectively pushed down, render an exposure factor, in this instance the shutter speed, changing its value so that a desired value can be set, a control button 11b for switching on and off an illumination source for a display 13, for example, of the liquid crystal light shutter type, and a film rewind crank 12.

Figure 4:
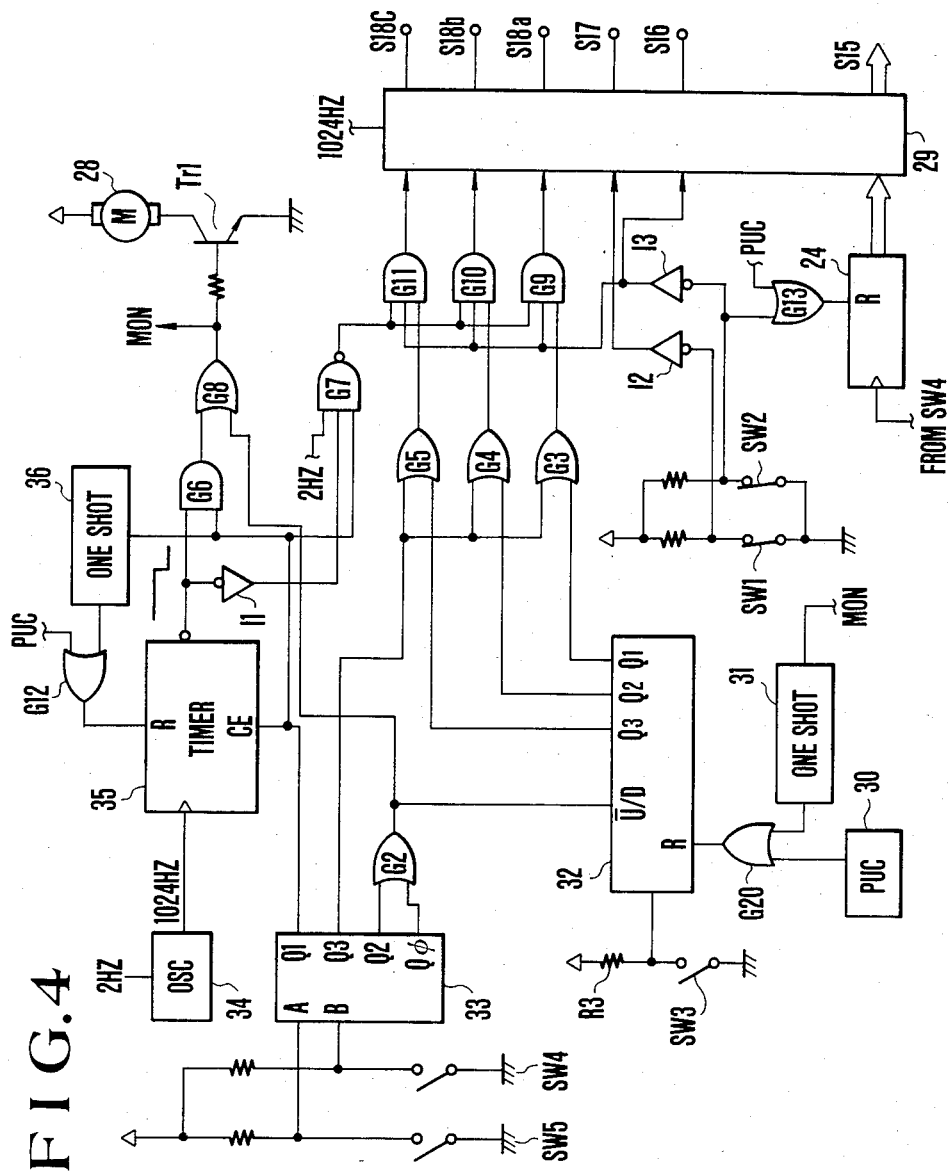
FIG. 4 is an electrical circuit diagram of a practical example of the circuitry of the display device of the invention.

FIG. 4 illustrates an example of the circuitry of the display device of the invention. A switch SW4 is arranged to cooperate with the shutter and to be open from the first moment at which the film has been advanced one frame to the moment just before the start of the winding operation. A switch SW5 is arranged to be open when the film rewinding operation is not underway. A decoder 33 has two inputs A and B which are connected to the respective outputs of the switches SW5 and SW4. A timer 35 responsive to an output Q1 from the decoder 33 counts clock pulses from a generator 34 and, in a prescribed time, changes its output from a high to a low level. Thus, the winding time is limited to a certain value.

The output of the timer 35 is connected to one of two inputs of an AND gate G6, the outer input of which is connected, to the output Q1 of the decoder 33. The output of the AND gate G6 is connected through an OR gate G8 to the base of a switching transistor Tr1. A spool drive motor 28 is connected at one end of a winding thereof to the collector of the transistor Tr1.

A Johnson counter 32 for counting pulses from the switch SW3 has an UP/DOWN input which is connected through an OR gate G2 to two ouputs Q1 and Q2 of the decoder 33. Three outputs Q1 to Q3 of counter 32 are connected to the respective OR gates G3 to G5 at one of the inputs thereof, the other inputs of which are connected to a common output Q3 of the decoder 33.

Inverters I2 and I3 are connected to the switches SW1 and SW2. AND gates G9 to G11 each have three inputs, one connected to a common output of a NAND gate G7, another input connected to a common output of the inverter I3, and the third input connected to the respective output of the OR gate G3, G4 or G5.

A frame counter 24 is connected to the switch SW4.

An LCD data driver 29 places the output of the gate G11 onto its output S18c for a pattern 18c in the display of FIG. 3, the output of the gate B10 onto its output S18b for a pattern 18b, the output of the gate G9 onto its output S18a for a pattern 18a, the output of the inverter I2 onto its output S17 for a pattern 17, the output of the inverter I3 onto its output S16 for a pattern 16, and the output of the counter 24 onto its output S15 for 7-segment patterns representing a film frame number.

The circuit of FIG. 4 further includes a PUC circuit 30 for producing a power-up clear pulse when the camera is loaded with a battery, two one-shot circuits 31 and 36, the one shot circuit 31 being triggered in response to the output of the gate G8, and a pulse generating circuit 34 for producing two trains of clock pulses of frequencies 1024 Hz and 2 Hz.

In operation, when the camera is loaded with a film cartridge 1, the pin 2 is lifted by the upper end of the cartridge 1, whereby the switch SW2 is turned on. Therefore, the output of the inverter I3 becomes high, and the driver 29, in response to this, switches on the electrode 16 of a similar shape to the cross-section of the cartridge 1. Thus, the display is changed from a position of FIG. 3(a) to another position of FIG. 3(b), informing the photographer that the cartridge 1 is present in the camera, even after the back cover is closed with the film leader 3a hooked to one of the pawls on the take-up spool 4.

To wind-off the light-struck end of the film, the photographer must push down the release button 10. Then, the shutter is opened and closed in a short time (is so set for the purpose of rapid movement), whereby the switch SW4 is turned on. In response to this, the decoder 33 produces a signal of a high level at the output Q1 thereof. (Since the switch SW5 is ON only in the rewind mode, the input A alone of the decoder 33 is high.) This output Q1 triggers the one-shot circuit 36, resetting the timer 35 to its initial state. At the same time, because its counting terminal CE is supplied with the output Q1, the timer 35 starts to count the pulses from the generator 34. As has been mentioned before, the output of this timer is maintained at a high level after it has been set to its initial position until a prescribed number of pulses are counted. Therefore, the outputs of the AND gates G6 and G8 are also maintained at a high level during that timer period, for which the transistor Tr1 is conducted to energize the motor 28. Thus, the film is advanced one frame while being taken up on the spool 4.

Figure 3A:
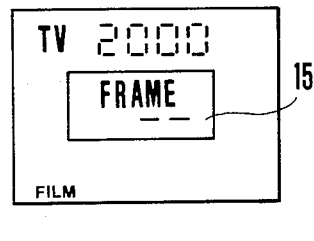
Figure 3D:
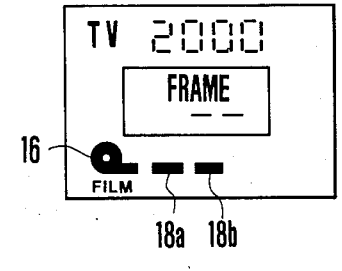
Figure 3B:
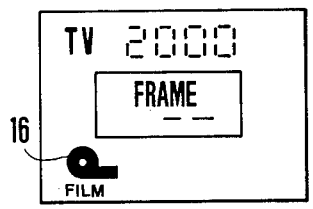
Figure 3E:
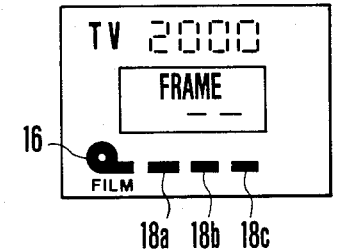
Figure 3C:
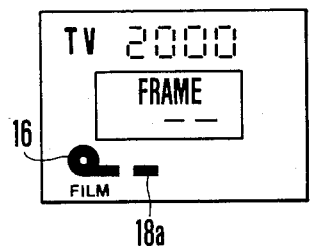

As the film 3 is advancing, the roller 7 is driven to rotate, and the switch SW3 is turned on and off repeatedly. Meanwhile, the other one-shot circuit 31 is triggered by the signal of high level from the gate G8 at the same time energization of the motor 28 starts and the output of the one-shot circuit 31 is applied through the gate G20 to reset the counter 32 in its initial position. Since the U/D input of the counter 32 is, at this time, supplied with a signal of a low level, the counter 32 is switched to the UP mode. Therefore, the count-up operation of the counter 32 begins with the very first pulse from the switch SW3. On the first pulse, the output Q1 changes to high level, which is then applied through the gate G3 to one of the three inputs of the AND gate G9. A high level signal appears at the other two inputs of the AND gate G9 from the inverter I3 and the output of the gate G7 (the latter of which takes a high level during the period of actuation of the timer 35). Then, in response to the output of the gate G3, the gate G9 changes its output to a high level, causing the output S18a of the driver to become high. Therefore, a first bold hyphen-like pattern 18a appears as a black line next to the bottom stroke of the cartridge-shaped pattern 16, as the display changes from the position of FIG. 3(b) to still another position shown in FIG. 3(c). Upon a second pulse, the counter changes its output Q2 to a high level. Similarly to the above, the gate G10 produces an output of a high level which is applied to the driver 29. In addition to the first pattern 18a, therefore, a second bold hyphen-like pattern 18b then appears as black line next to the first pattern 18a. Thus, the display changes further to a position shown in FIG. 3(d). Upon a third pulse, the counter 29 changes its output Q3 to a high level. In response to this, the gate G11 changes its output to a high level. In addition to the first and second patterns 18a and 18b, therefore, a third bold hyphen-like pattern 18c then appears as a black line next to the second hyphen 18b. Thus, the display is further changed to another position shown in FIG. 3(e). As a result, each time the film is advanced through the length of one frame, the different displays of FIGS. 3(c) to 3(e) are presented successively so that it appears that the film is pulled out of the cartridge.

Figure 3F:
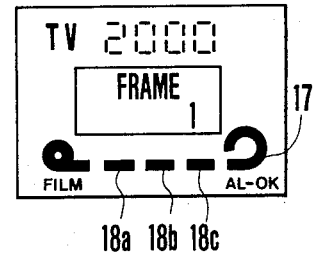

As the aforementioned film movement occurs, the root 3b of the film tongue moves across the lever 5, turning it in a clockwise direction, and thereby turning on the switch SW1. In response to this, the inverter I2 changes its output to a high level which is applied to changes the output S17 of the driver 29 to a high level. Therefore, a curtail-like pattern 17 and the letters "AL-OK" (abbreviating automatic loading OK) appear as shown in FIG. 3(f), thus making sure that the film leader is firmly taken up on the spool 4.

When the first cycle of the film winding operation is completed, the switch SW4 is turned off, whereby the output Q3 of the decoder 33 is changed to "1". Therefore, the transistor Tr1 is turned off, and the motor 28 stops. Thus, the film is no longer pulled out by the spool 4.

Such movement of the switch SW4 from the ON to the OFF position also causes the counter 24 to count up one step.

Upon actuation of the release button for the second time, the above-described procedure repeats itself with the sequence shown in the displays of FIGS. 3(b) to 3(e).

Now assume that the release actuation has been repeated three times in total and the blank feeding operation of the film has been completed. When the switch SW2 is then turned on, the number of pulses counted by the counter 24 becomes three. When the counted number of the counter 24 is from 0 to 2, driver 29 selects only the central one of the seven segments in every one of the two digit characters in the frame counter display 15 to be driven so that a display [- -] is presented. When the counted number is 3 or more, driver 29 selects a digit [1] or a corresponding digit to the number of exposed frames to be represented by the seven segments. During the blank film feeding operation the display [- -] is presented, and at the completion of movement of the light-struck end of the film, out of the way, the display [1] in the frame number is presented.

After the camera has been automatically loaded to be ready for its first picture, each time the exposure is terminated, the camera is automatically wound up, while the film feeding is displayed by successively activating the patterns 18a to 18c as described above, and the sum of the number of exposed frames and one is displayed in the area 15.

Since the film is either in tension with or no longer supplied from the cartridge, if one cycle of winding operation is not completed within the period of time determined by the timer 35, the switch SW4 is maintained closed until the termination of that period of time at which the output of the timer 35 changes to a low level. In response to this, the gate G6, despite the fact that the switch SW4 is ON, must change its output to a low level, whereby the supply of electrical power to the motor 28 is cut off. Thus, the spool 4 is stops. Such a change of the output of the timer 35 also causes a change in the output of the inverter I1 to a high level. Therefore, the gate G7 produces a train of pulses of 2 Hz which is applied to the gates G9 to G11. In this case, therefore, the patterns 18a to 18c are activated intermittently at the frequency of 2 Hz, giving a warning signal to that effect.

When rewinding the film, the photographer needs to operate a rewind control member (not shown) so that the motor is taken out of a driving connection to the spool and is brought into connection with a rewind mechanism (not shown). When the rewind control member is operated, the switch SW5 is turned on, whereby the output Q1 or Q2 of the decoder 33 is changed to a high level. This signal of high level is applied through the gates G2 and G8 to the transistor Tr1. Therefore, the motor is energized and a rewinding operation of the film is initiated.

Meanwhile, the signal of a high level from the gate G2 is applied to switch the counter 32 to the DOWN mode. As the rewinding of the film goes on, the ON and OFF operation of the switch SW3 is recycled to produce pulses which are counted out of the content in the counter 32. Therefore, the sequence of the occurrence of a high level at the outputs of the counter is reversed to that when in the wind-up mode. Thus, the Q3, Q2, Q1 of a high level is followed by the Q2, Q1 of a high level, then by the Q1 of a high level, then by the Q3 to Q1 of a low level, then by the Q3, Q2 and Q1 of a high level and so on. As a result, the patterns 18a to 18c of the display 13 are activated successively but in the reversed direction of FIGS. 3(e) to 3(b). Thus, rewinding of the film is displayed in opposition to the winding up of the film.

As the rewinding operation nears the terminal end, when the film end moves away from the spool, the switch SW1 is turned off, causing the pattern 17 to disappear. Soon after that, the root 3b of the film tongue moves past the roller, whereby the ON and OFF operation of the switch SW3 is terminated, and the displays by the patterns 18a and 18c are no longer shifted, informing the photographer that all the film except the leader has been rewound into the cartridge.

The above-described display is provided externally on the upper panel of the camera housing. In addition thereto, another identical display may be provided in the field of view of the finder as shown in FIG. 5, connected to the common driver 29.

As has been described above, the present invention provides a display device for displaying whether the cartridge is present or absent and when the film is in a state of being transportated by using coordinated patterns. Even for the beginner, it is easy to insure that the camera is empty when loading a new cartridge and that the film is transported normally.

What is claimed is:

1. A camera having a display device, comprising:
   (a) film transport detecting means for detecting whether a film is being transported or not being transported and for forming a transport signal when the film is transported;
   (b) a display device having a plurality of display elements for indicating a plurality of display states;
   (c) a control circuit responsive to said transport signal for activating said display elements successively in a prescribed order, said circuit effecting the display states of the plurality of display elements when the film transport stops upon completion of advancement of one frame;
   (d) a timer circuit for producing an output when the transportation of film corresponding to one frame is not completed within a timer period; and
   (e) said control circuit being responsive to said output for moving the display state of said display elements to a different display state from that effected in response to said transport signal.

2. A display device for a camera comprising:
   (a) a plurality of display elements; and
   (b) a display control circuit responsive to film transport for changing the display pattern of said display elements and responsive to completion of advancement of one frame of film for transferring the display pattern to a particular one representing the completing state of film transport.

3. A display device according to claim 2, wherein said display elements are arranged in a row, and the number of driven elements is increased when the film is transported.

4. A display device for a camera comprising:
(a) a plurality of display elements arranged in a row;
(b) a cartridge-shaped display portion arranged at one end of the row of said display elements;
(c) a film take-up loop-shaped display portion arranged at another end of the row of said display elements; and
(d) a drive circuit for rendering the elements displaying successively in a direction for the nearest one to the cartridge-shaped display portion to the loop-shaped display portion when the film is wound up, and rendering the elements displaying successively in another direction from the nearest one to the loop-shaped display portion toward the cartridge-shaped display portion when the is film is rewound.

5. A display device for a camera comprising:
(a) a plurality of display elements;
(b) detecting means for detecting a film transport operation;
(c) a display control circuit responsive to detection of the film transport operation by said detecting means for changing the display pattern of said display elements successively so the film transport is displayed; and
(d) a detecting circuit for detecting that the transport operation has stopped before the film is advanced one frame by said film transport operation so that said display control renders the display elements in a particular display state in response to a signal from said detecting circuit.

6. A display device for a camera comprising:
(a) a plurality of display elements arranged in a row;
(b) a cartridge-shaped display portion arranged at one end of the row of said display elements;
(c) a film take-up loop-shaped display portion arranged at another end of the row of said display elements; and
(d) a drive circuit for driving at least said display elements when a film is transported, said circuit driving the display elements successively in a direction from the nearest one to the cartridge-shaped display portion to the take-up loop-shaped display portion, when the film is being wound up.

7. A display device for a camera comprising:
(a) a plurality of display elements arranged in a row;
(b) a cartridge-shaped display portion arranged at one end of the row of said display elements; and
(c) a drive circuit for driving at least said display elements when a film is transported, said circuit driving the display elements successively in a direction from the nearest one to the cartridge-shaped display portion to farther ones when the film is being wound up.

8. A display device for a camera comprising:
(a) a plurality of display elements arranged in a row;
(b) a film take-up loop-shaped display portion arranged at one end of the row of said display elements; and
(c) a drive circuit for driving at least said display elements when a film is transported, said circuit driving the display elements successively in a direction from a farther one from the display portion toward the display portion when the film is being wound up.

9. A display device for a camera comprising:
(a) a plurality of display elements;
(b) detecting means for detecting a film transport operation;
(c) a display control circuit responsive to detection of the film transportation by said detecting means for successively changing the display pattern of said display elements, said circuit being arranged for causing said display elements to present a particular pattern when the film is transported one frame;
(d) a film frame detector for detecting the number of frames transported;
(e) a film frame display for displaying the frame number detected by said detector, said display being arranged for renewing the displayed frame number when said display elements show the aforesaid particular pattern.

10. A display device according to claim 9, wherein said camera includes a detecting circuit for detecting the fact that the film has been transported one frame, said display control is arranged for causing said display elements to change their display pattern to the aforesaid particular one when the completion of the one-frame transportation of the film is detected by said detected circuit, and said display is arranged for renewing the displayed frame number in response to the aforesaid detecting operation of said detecting circuit.

11. A display device for a camera comprising:
(a) a plurality of display elements arranged in a row;
(b) a cartridge-shaped display portion arranged at one end of said row of display elements; and
(c) a drive circuit for driving at least said display elements when film is being transported, said drive circuit shifting said display elements from a display state to a non-display state, one after another, from one of said display elements located farthest from the cartridge-shaped display portion while the film is being rewound and indicating progress in the rewinding by shifting the display elements, one by one, from the display state to the non-display state in the direction toward the cartridge-shaped display portion to decrease the number of display elements which are in the display state in said direction.

* * * * *